Nov. 12, 1968  W. R. GARRETT  3,410,355
TELESCOPIC JOINT HAVING MEANS FOR SIGNALLING WHEN THE
JOINT IS EXTENDED
Filed Aug. 2, 1966

William R. Garrett
INVENTOR.

BY Murray Robinson
ATTORNEY

United States Patent Office 3,410,355
Patented Nov. 12, 1968

3,410,355
TELESCOPIC JOINT HAVING MEANS FOR SIGNALLING WHEN THE JOINT IS EXTENDED
William R. Garrett, Midland, Tex., assignor to Smith Industries International, Inc.
Filed Aug. 2, 1966, Ser. No. 569,727
5 Claims. (Cl. 175—40)

ABSTRACT OF THE DISCLOSURE

A signalling telescopic joint, especially suited for air drilling includes inner and outer tubes splined together, the outer tube having a stinger carrying a plug cooperating with a constriction in inner tube to restrict flow and signal that joint is near full extension. A seal retains fluid inside joint and prevents foreign material outside joint from entering spline. Spline communicates with interior of inner tube above and below constriction so spline groove is blown clean when plug enters constriction and creates pressure drop across spline. Stops limit extension and contraction of joint to less travel than allowed by spline. Removal of one stop allows further extension of joint to expose seal for replacement.

---

This invention pertains to a torque transmitting sealed, telescopic joint for tubular members and is particularly adapted for use in air drilling.

In air drilling the construction embodying the invention may be used between the lower end of the drill pipe and an air hammer driving a percussion bit. The air hammer will usually be immediately above the percussion bit. The telescopic joint will usually be immediately above the air hammer but if desired there may be one or more drill collars between the hammer and telescopic joint. The hammer is known in the mining and oil well drilling industry as a "Down Hole Percussor" to distinguish it from arrangements in which the hammer is above ground and there is a long pipe or bar (anvil) extending down the hole from the hammer to the bit. The hammer is usually a free piston air motor in which the reciprocating piston (e.g. 1500 strokes per minute) functions as a hammer to strike an anvil connected to the bit. Usually the anvil and bit are integral because threaded connections will fail. The drill string is rotated slowly to change the position of the chisel-like bit in the hole.

It is desirable to control the weight on the bit very closely in order to avoid rapid deterioration of the bit. In fact it is found that the percussion bit usually works best with substantially zero or very little weight on it. It is difficult to achieve this result from the surface. The subject telescopic joint is inserted between the hammer and lower end of the drill pipe so that none of the weight of the drill pipe is imposed on the bit, thereby automatically achieving the desired result.

Periodically when the joint approaches or reaches the limit of its extension as the bit drills deeper into the hole the operator will lower the drill string to contract the telescopic joint so as to allow the bit to continue its downward travel in the bottom of the hole.

In the past telescopic joints have been provided with signalling means to indicate to the operator when the telescopic joint has been fully extended and/or contracted. See for example the disclosures of United States Patents 1,770,488—La Champ et al.; 2,761,651—Ledgerwood, Jr.; and 2,809,013—Ledgerwood, Jr. et al.

The present invention has for its principal objects the provision of an improved signalling, torque transmitting, sealed, telescopic joint especially suited for air drilling, wherein the sealing means will be readily replaceable, the parts will be easy to manufacture, the joint will not be likely to fall apart in the hole, the torque transmitting and seal means will be long lasting, and the signalling means will be operable without interruption of the operation of the percussor.

Other objects and advantages of the invention will become apparent from the following description thereof.

Briefly, in accordance with the invention the inner and outer tubes of the telescopic joint are splined together by means of a plurality of cylindrical bars. The bars are held in semi-cylindrical grooves in the outer tube and slidably engage semi-cylindrical grooves of greater length than the bars formed in the inner tube. Cooperating stops are provided on the tubes to limit the extension and contraction of the joint, preventing contact of the bars with the ends of the grooves in the inner tube. A replaceable seal is provided around the inner tube engaging the interior of the lower end of the outer tube below the spline. Since the outer tube is adapted to be connected to the upper part of the drill string and the inner tube is adapted to be connected to the lower part of the drill string, the seal protects the spline against annulus fluid. The stop on the outer tube is removable to enable the joint to be extended farther than normally allowed, sufficient to expose the seal so it can be replaced without taking the whole joint apart. Near its upper end the outer tube carries a spider on which is mounted a stinger extending down into the inner tube. The stinger carries a plug at its lower end adapted to cooperate with a constriction in the inner tube. When the joint approaches full extension the plug enters the constriction to signal such position by causing an increase of pressure in the drill string. The rise in pressure is observable at the surface. Upon full extension of the joint the plug passes the constriction so that maximum air flow is available as is desirable to provide full circulation for cleaning the hole. It is to be noted that no drilling fluid, e.g. air, is vented from the drill string in operation of the signalling means.

For a detailed description of a preferred embodiment of the invention, reference will now be made to the accompanying drawings wherein.

Figure 1:
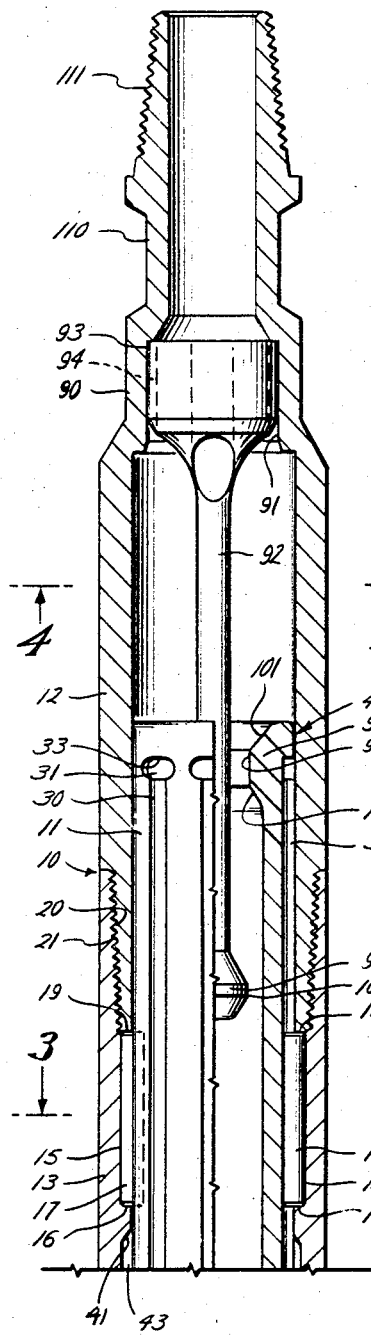
FIGURE 1 is an elevation, partly in section, showing the upper part of the telescopic joint embodying the invention.
Figure 2:
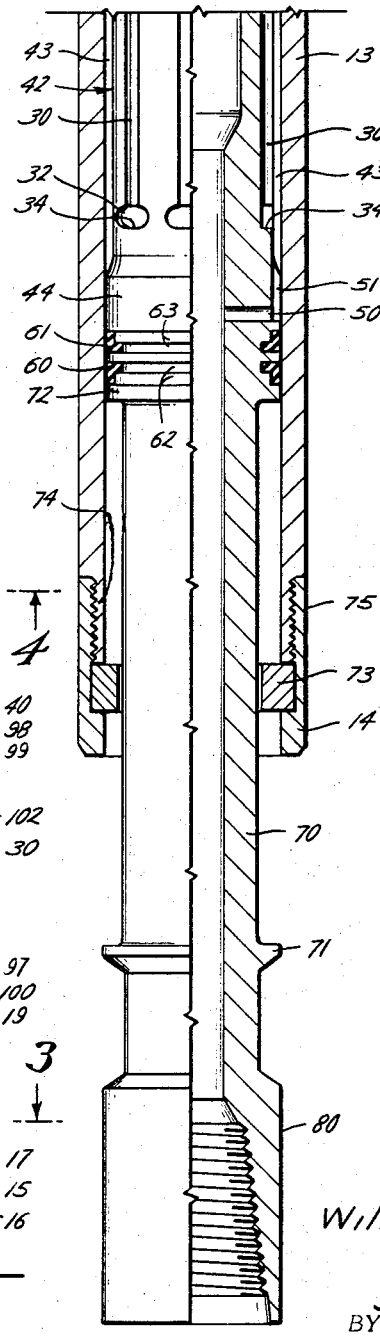
FIGURE 2 is an elevation, partly in section showing the lower part of the telescopic joint of FIGURE 1.
Figure 3:
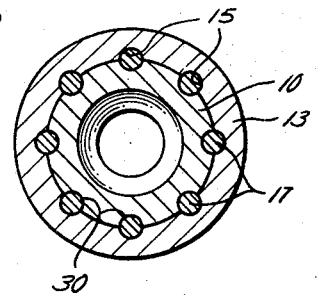
FIGURE 3 is a section taken at the plane indicated at 3—3 in FIGURE 1.

Referring now to FIGURES 1 and 2 there is shown a telescopic joint including an outer tube 10 and inner tube 11. The outer tube includes an upper pipe 12, a lower pipe 13, and a nut 14, all screwed together. There are a plurality of semi-cyclindrical grooves 15 (see FIGURE 3) inside pipe 15 terminating at their lower ends 16. Within grooves 15 are received cylindrical steel bars 17 bearing against the lower ends 16 of the grooves and retained against axial motion by the lower end 19 of pipe 12. When the threaded pin 20 of pipe 12 is screwed into threaded box 21 of pipe 13, the bars 17 are securely held against axial motion.

The inner portions of bars 17 are slidably received in longitudinal semi-cylindrical grooves 30 (see FIGURE 3) in the outer periphery of the inner tube 11. At the ends of grooves 17 there are holes 31, 32 extending radially into the inner tube. Holes 31, 32 are provided to facilitate machining. They also provide flat surfaces 33, 34 against which the ends of bars 17 abut at the maximum contraction and extension of the joint.

Except for the grooves 30, the inner tube makes a fairly close sliding fit with the inner surface of pipe 12, as shown at 40. Pipe 13 however, below shoulder 41 near the lower end of the bars 17, has a larger inner diameter than the outer diameter of tube 11, as shown at 42, leaving an annular space 43 there between. There is an enlargement or hub 44 on inner tube 11, below the lower ends of grooves 30. Hub 44 makes a fairly close sliding fit with the inner surface of pipe 13, thus providing guide means to keep the tubes concentric during contraction and extension of the telescopic joint. The guide means also takes some of the load when bending moment is applied to the joint.

One or more radial ports 50 in hub 44 connect with one or more longitudinal ports 51 which in turn communicate at their upper ends with annulus 43. With this arrangement fluid leaking between tube 11 and pipe 12 at 40 will travel down through annulus 43 and ports 51, 50 back into inner tube 11, thereby flushing out grooves 30.

Seal means comprising oppositely facing annular packing cups 60, 61 are received in grooves 62, 63 formed in the outer periphery of hub 44, making a sliding seal between inner tube 11 and pipe 13 of the outer tube. This prevents fluid in the casing annulus, the fluid returning the cuttings to the surface, from contacting the bars 17 and grooves 30 forming the spline means.

Below hub 44 the inner tube 11 is of smaller outer diameter than at 40 forming an elongated neck 70. Near the lower end of the neck is an elongated diameter portion 71 forming a stop means. The lower end 72 of hub 44 also forms a stop means. A ring 73 is held between the lower end of threaded pin 74 on pipe 13 and the bottom of threaded box 75 of nut 14. The ring 73 is initially split in two halves, then assembled on neck 70 and the two halves welded together. Then nut 14 is screwed onto pipe 13, the ring 73 being held therebetween. Ring 73 forms stop means on the outer tube engageable with the stop means 71, 72 on the inner tube to limit the extension and contraction of the joint.

The distance between stop means 71 and 72 minus the thickness of ring 73 is less than the distance between the surfaces 33, 34 minus the length of bars 17. Ring 73 is so positioned relative to stop means 73, 74 as to normally prevent the bars 17 from contacting surfaces 33, 34. However, if nut 14 should accidentally become unscrewed from pipe 13, the bars 17 and surfaces 33, 34 would then be engageable to hold the joint together and prevent a fishing job.

Whenever it is desired to replace seal means 60, 61, it is only necessary to unscrew nut 14 from the tube 13, thereby allowing the fuller extension of the joint permitted by bars 17 and surfaces 33, 34. This exposes the seal means below the lower end of the pipe 13 so that the seal means can be replaced.

Below stop means 71 the inner tube 11 is provided with a threaded box 80 for connection to a percussor, drill collar or other lower part of the drill string.

Figure 4:
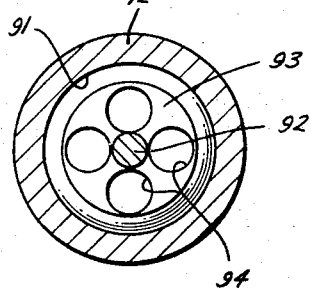
FIGURE 4 is a section taken at the plane indicated at 4—4 in FIGURE 1.

Referring now particularly to FIGURES 1 and 4, the pipe 12 has a portion 90 of reduced outer and inner diameter forming a socket 91. A stringer 92 has a spider 93 at its upper end received in socket 91 and suitably secured in place, e.g. by a press fit, shrink fit, cement, or other means. Ports 94 provide longitudinal fluid passages through the spider.

The lower end of the stinger carries a plug 97 of fusiform cross section. A constriction 98 near the upper end of tube 11 has an inner peripheral cylindrical surface 99 of slightly larger diameter than the outer peripheral cylindrical surface 100 of the plug. Guide tapers 101, 102 are formed at the upper and lower ends of constriction 98. Plug 97 and constriction 98 form choke means presenting an increased resistance to fluid flow through the telescopic joint when the joint is near to full extended position wherein plug 97 is inside constriction 98. The choke means does not, however, prevent fluid flow; it merely requires an increase in pressure in the upper part of the drill string to maintain any given flow rate. This signals the operator that it is time to lower the drill string.

When the telescopic joint is fully extended the plug 97 moves up past and out of constriction 98 to enable maximum flow to be achieved, as may be desirable to clean the well, e.g. before lowering the drill string, after drilling the full extent permitted by extension of the telescopic joint. No signal means is needed to tell the operator how far to lower the drill string since the telescopic joint has a known travel between full extended and full contracted positions. The operator merely lowers the drill string a lesser distance.

The upper end of piper 12 is provided with a fishing neck 110 and a threaded pin 111 for making connection with the drill pipe or other string members thereabove.

Although the invention has been described as especially applicable to air drilling, it is also well suited for drilling with other fluids including liquids and mud. The replaceable seal construction is especially advantageous when drilling with a highly abrasive fluid such as drilling mud.

While a preferred embodiment of the invention has been shown and described, many modifications thereof can be made by one skilled in the art without departing from the spirit of the invention.

That being claimed is:
1. A sealed, torque-transmitting, signalling telescopic joint comprising
   an inner tube, an outer tube axially slidably disposed around the inner tube,
   means at the upper end of the outer tube for making connection to a drill string,
   means at the lower end of the inner tube for making connection to a drill string,
   spline means preventing relative rotation of said inner and outer tubes while permitting relative axial motion thereof,
   means limiting the relative axial motion of said inner tube and outer tube to motion in a range between a fully extended position and a fully contracted position,
   seal means forming a sliding seal between said inner tube and said outer tube, and
   choke means restricting flow through said joint when said tubes are in a particular position within said range of relative axial travel,
   said telescopic joint in all relative positions of said inner tube and outer tube throughout said range of relative motion thereof providing means to transmit fluid from said connection means at the upper end thereof to said connection means at the lower end thereof without loss of fluid,
   said spline means comprising a longitudinally extending bar held on one of said tubes against longitudinal movement and slidably cooperating with a groove in the other side of said tubes,
   said means limiting axial travel of said tubes including stop means on said inner tube and said outer tube limiting relative axial motion of said tubes to less than the range of relative axial motion of said tubes permitted by said bar sliding in said groove,
   said stop means being releasable to allow extension of said telescopic joint to the maximum amount permitted by said bar and groove of said spline means,
   said seal means being exposed in position for replacement when said telescopic joint is extended to said maximum amount.

2. A sealed, torque-transmissing, signalling telescopic join comprising
   an inner tube, an outer tube axially slidable disposed around the inner tube,
   means at the upper end of the outer tube for making connection to a drill string,
   means at the lower end of the inner tube for making connection to a drill string, spline means preventing relative rotation of said inner and outer tubes while permitting relative axial motion thereof, means limiting the relative axial motion of said inner tube and outer tube to motion in a range between a fully extended position and a fully contracted position, seal means forming a sliding seal between said inner tube and said outer tube, and choke means restricting flow through said joint when said tubes are in a particular position within said range of relative axial travel, said telescopic joint in all relative positions of said inner tube and outer tube throughout said range of relative motion thereof providing means to transmit fluid from said connection means at the upper end thereof to said connection means at the lower end thereof without loss of fluid.

said spline means including a plurality of longitudinally extending bars held on one of said tubes and slidably cooperating with a plurality of longitudinally extending grooves in the other of said tubes, said bars being cylindrical and said grooves being semi-cylindrical, said bars being disposed in a further set of semi-cylindrical grooves in said one of said tubes spaced circumferentially about said one tube, the last said grooves being of the same length of said bars, the first said grooves being of greater length than said bars, said bars and the ends of the last said grooves forming auxiliary stop means limiting the extension and contraction of said telescopic joint.

3. Combination of claim 2 wherein said stop means is releasable to allow extension of said telescopic joint to the maximum amount permitted by said bars and said groove ends of said spline means, said seal means being exposed in position for replacement when said telescopic joint is extended to said maximum amount, said bars and said groove ends of said spline means serving as safety stop means preventing complete disconnection of said telescopic joint in the event of accidental release of said stop means.

4. A sealed, torque-transmitting, signalling telescopic joint comprising an inner tube, an outer tube axially slidably disposed around the inner tube, means at the upper end of the outer tube for making connection to a drill string, means at the lower end of the inner tube for making connection to a drill string, spline means preventing relative rotation of said inner and outer tubes while permitting relative axial motion thereof, means limiting the relative axial motion of said inner tube and outer tube to motion in a range between a fully extended position and a fully contracted position, seal means forming a sliding seal between said inner tube and said outer tube, and choke means restricting flow through said joint when said tubes are in a particular position within said range of relative axial travel, said telescopic joint in all relative positions of said inner tube and outer tube throughout said range of relative motion thereof providing means to transmit fluid from said connection means at the upper end thereof to said connection means at the lower end thereof without loss of fluid, said spline means comprising longitudinally extending groove means disposed on the exterior of the inner tube and longitudinally extending bar means disposed on the interior of said outer tube and held against circumferential movement around the axis of said outer tube and slidably cooperating with said groove means on the inner tube, said groove means on the exterior of said inner tube extending longitudinally downwardly from adjacent the upper end of the inner tube, said choke means comprising a constriction inside the inner tube at a level adjacent the level of said groove means on the exterior of said inner tube, said choke means further comprising a stinger having a plug thereon adapted to cooperate with said constriction in said particular position corresponding to flow restriction without completely blocking flow through the joint, said stinger being connected at its upper end to a spider secured on the outer tube at a level that is adjacent the upper end of the inner tube when the telescopic joint is in fully contracted position, said stinger extending inside said inner tube and downwardly parallel to and inwardly of said groove means of said inner tube when said telescopic joint is in fully contracted position, said seal means being disposed below said spline means to protect said spline means from fluids outside said telescopic joint, said inner tube including port means extending from the interior of the tube to the exterior thereof above said seal means adjacent to the lower end of said grooves to drain the spline means of fluid entering the spline means from inside the telescopic joint, said seal means including a hub on said inner tube below said grooves of said spline means, said hub having a larger diameter than the grooved portion of said inner tube, said outer tube having a sealing surface on the interior thereof below said bar means of said spline means, said sealing surface having an inner diameter correlative to said diameter of the hub to make a sliding fit therewith, said hub carrying packing on its outer periphery to seal with said sealing surface, said sealing surface of the outer tube and the outer surface of said inner tube above said hub defining an annulus communicating with said grooves in the inner tube and said port means through the inner tube.

5. A sealed, torque-transmitting, signalling telescopic joint comprising an inner tube, an outer tube axially slidably disposed around the inner tube, means at the upper end of one tube for making connection to a drill string, means at the lower end of the other tube for making connection to a drill string, means preventing relative rotation of said inner and outer tubes and limiting the relative axial motion of said inner tube and outer tube to motion in a range between a fully extended position and a fully contracted position, seal means forming a sliding seal between said inner tube and said outer tube, and choke means restricting flow through said joint when said tubes are in a particular position within said range of relative axial travel, said choke means comprising a socket in one of said tubes, a stinger having spider at one end and a plug at the other end, said spider being fixedly held in said socket with an interference fit preventing relative axial motion of said stinger and said one of said tubes, said spider having fluid passage means therethrough placing the portion of said one of said tubes above said spider in communication with the portion of said one of said tubes below said spider, and a constriction in the other of said tubes having an opening therethrough larger than said plug leaving room for fluid flow past said plug in all positions of said plug relative to said constriction, said means preventing relative rotation of said inner and outer tubes including cooperating longitudinally extending bar and groove means, said longitudinally extending means being located at the juncture of the inner periphery of said outer tube and the outer periphery of said inner tube, said seal means being disposed upstream from said groove means with respect to any material outside the joint tending to flow into said groove means, said groove means being in communication with the interior of said joint at levels above and below the portion of said joint where flow is restricted when said tubes are in said particular position within said range of relative axial travel.

References Cited

UNITED STATES PATENTS

| 1,766,326 | 6/1930 | Bozeman et al. | 175—321 X |
| 2,240,519 | 5/1941 | Reed. | |
| 2,334,309 | 11/1943 | Brown | 64—23 |
| 3,223,183 | 12/1965 | Varney | 175—40 X |
| 3,225,566 | 12/1965 | Leathers | 175—321 X |

OTHER REFERENCES

Composite Catalog of Oil Field Equipment and Services: Houston, Tex., Gulf Pub. Co., 1962–63, vol. 1, p. 382. (Copy in Group 354).

CHARLES E. O'CONNELL, *Primary Examiner.*

I. A. CALVERT, *Assistant Examiner.*